United States Patent [19]
Alatalo

[11] Patent Number: 5,673,929
[45] Date of Patent: Oct. 7, 1997

[54] PROCESS OF HYDROFORMING TUBULAR SUSPENSION AND FRAME COMPONENTS FOR VEHICLES

[75] Inventor: Clark Alatalo, Brighton, Mich.

[73] Assignee: Mascotech Tublular Products, Inc., Hamburg, Mich.

[21] Appl. No.: 731,100

[22] Filed: Oct. 9, 1996

Related U.S. Application Data

[63] Continuation of Ser. No. 414,076, Mar. 31, 1995.
[51] Int. Cl.$^6$ ................................................. B62D 7/16
[52] U.S. Cl. ...................... 280/690; 280/691; 280/675; 29/897.2
[58] Field of Search ................................ 280/690, 691, 280/675, 673, 663, 688, 93, 96.1, 660, 704; 52/731.6; 29/897.2

[56] References Cited

U.S. PATENT DOCUMENTS

| | | | |
|---|---|---|---|
| 4,650,620 | 3/1987 | Owon et al. ........................ | 264/757 |
| 4,822,073 | 4/1989 | Tanchashu et al. ................ | 280/673 |
| 5,310,211 | 5/1994 | Delbeke ............................... | 280/673 |
| 5,338,057 | 8/1994 | Dickerson et al. ................. | 280/675 |
| 5,362,090 | 11/1994 | Takeuchi ............................ | 280/660 |

FOREIGN PATENT DOCUMENTS 1267549  12/1981  France ................................ 280/673

*Primary Examiner*—Christopher P. Ellis
*Attorney, Agent, or Firm*—Edgar A. Zarins; Malcolm L. Sutherland

[57]                ABSTRACT

A process of hydroforming tubular suspension and frame components of a vehicle which results in substantial weight reductions while maintaining strength and integrity of the assembly. The process forms a hydroformed tubular trailing arm having a curved configuration to comply with the design requirements of the suspension. The trailing arm has a spring seat base hydroformed therein, an extruded shock mount and bushing mount formed as integral components. A mounting plate is attached to the trailing arm for attaching the vehicle wheel.

7 Claims, 2 Drawing Sheets

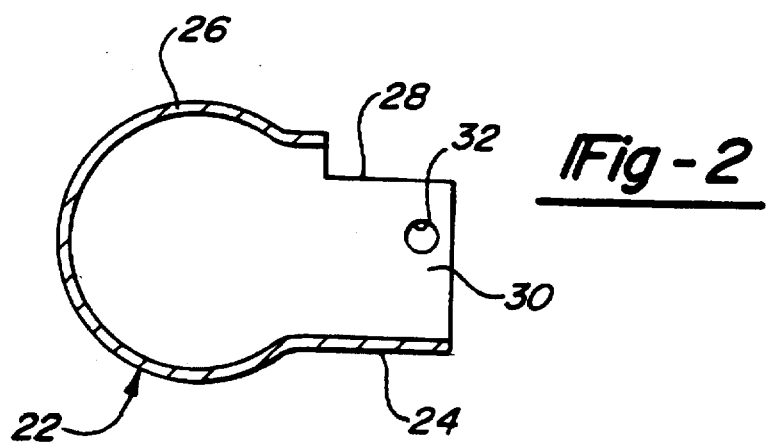
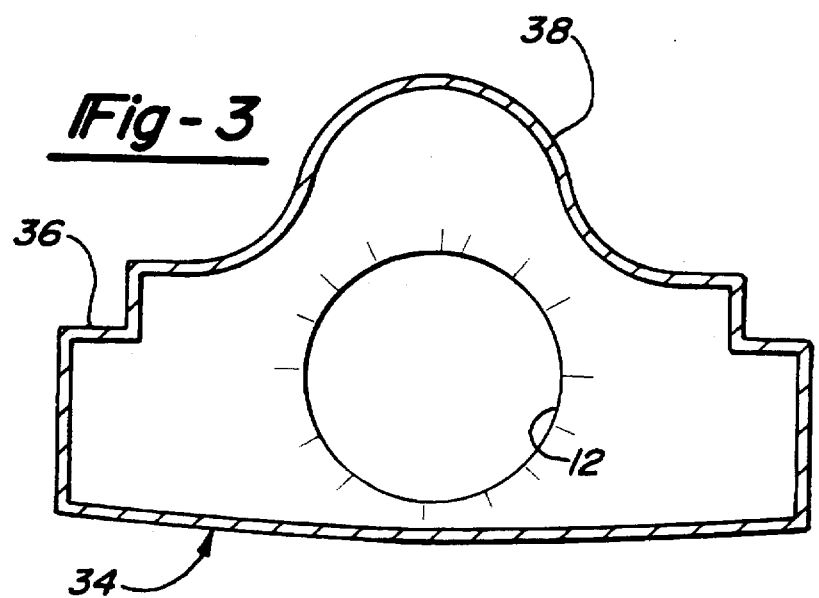
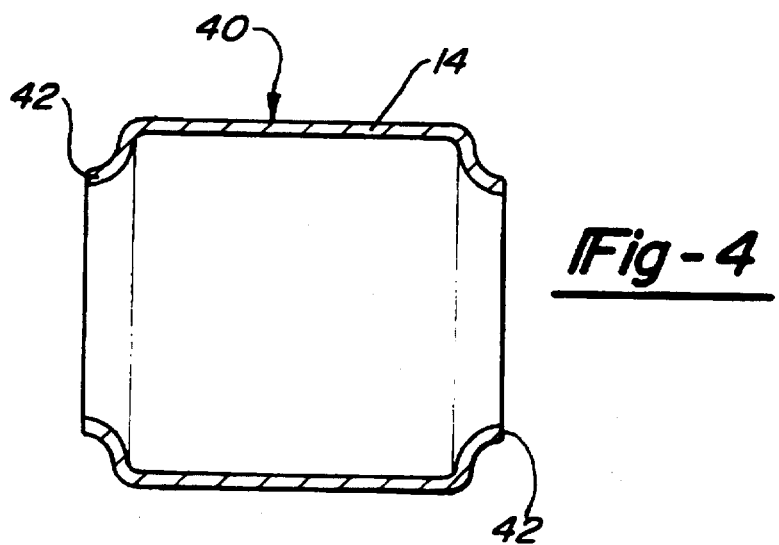

PROCESS OF HYDROFORMING TUBULAR SUSPENSION AND FRAME COMPONENTS FOR VEHICLES

This is divisional of copending application(s) Ser. No. 08/414,076 filed on Mar. 31, 1995.

BACKGROUND OF THE INVENTION

I. Field of the Invention

This invention relates to suspension and frame assemblies for vehicles and, in particular, a hydroformed tubular axle for a vehicle which results in a substantial reduction in component weight while maintaining integrity of the suspension assembly.

II. Description of the Prior Art

Vehicle manufacturers continually strive to reduce the weight of vehicle components to improve vehicle performance. Additionally, integral components are encouraged reducing assembly costs for the vehicle. However, in reducing the weight of components, the structural integrity of the vehicle cannot be compromised and the complex configurations of many vehicle parts makes manufacture more complex. These are the drawbacks of the prior known manufacturing techniques.

The prior known vehicle components are typically stamped, cast, or rollformed into subcomponents which may then be welded together to form the completed assembly. In addition to being a substantial source of weight, the welds between subcomponents must be formed to exact specifications to ensure durability. The assembly and quality control associated with these components can be a considerable cost of manufacturing. Nevertheless, in order to form the complex configurations to fit within engineering specifications it was believed that only welded components would be satisfactory.

SUMMARY OF THE PRESENT INVENTION

The present invention overcomes the disadvantages of the prior known vehicle components for the suspension by hydroforming a tubular trailing arm to exact engineering specifications while reducing the weight and assembly costs of the overall assembly.

The present invention is directed to a process of hydroforming a trailing arm for an axle assembly of a vehicle. The process begins with a tubular blank having open ends and a predetermined length. The tubular blank is first bent to the primary configuration by filling the blank with a pressurizing fluid and maintaining a predetermined internal pressure as the blank is bent to the desired shape. Use of hydroforming pressure during bending prevents crimping of the tube and a uniform wall thickness along the length of the tube. The curved tube is then positioned within a die cavity substantially conforming to the desired configuration of the finished components. In a preferred embodiment of the process, the die cavity includes secondary cavities for forming features of the trailing arm such as a bushing mount, spring seat base, and a shock mount. As the interior of the curved tube is pressurized, the metal material will be forced outwardly to fill these secondary cavities as the tube conforms to the configuration of the die cavity. Proximate the bushing mount, the die cavity will have a substantially square configuration and the bushing mounts are extruded outwardly on opposite sides for the square beam. The spring seat base is hydroformed approximately at a midpoint in the tubular component. The shock mount is extruded outwardly at the other end of the tubular trailing arm. In the case of both the shock mount and bushing mount, further machining of the hydroformed bulge is required to create the necessary configuration. A hub plate is secured to the end of the trailing arm to receive the wheel assembly.

Other objects, features and advantages of the invention will be apparent from the following detailed description taken in connection with the accompanying drawings.

BRIEF DESCRIPTION OF THE DRAWINGS

The present invention will be more fully understood by reference to the following detailed description of a preferred embodiment of the present invention when read in conjunction with the accompanying drawing, in which like reference characters refer to like parts throughout the views and in which:

FIG. 2 is a cross-sectional view of the shock mount formed on the trailing arm taken along lines 2—2 of FIG. 1;

FIG. 3 is a cross-sectional view of the spring seat base formed on the trailing arm taken along lines 3—3 of FIG. 1; and FIG. 4 is a cross-sectional view of the bushing mount in the trailing arm taken along lines 4—4 of FIG. 1.

DETAILED DESCRIPTION OF A PREFERRED EMBODIMENT OF THE PRESENT INVENTION

Figure 1:
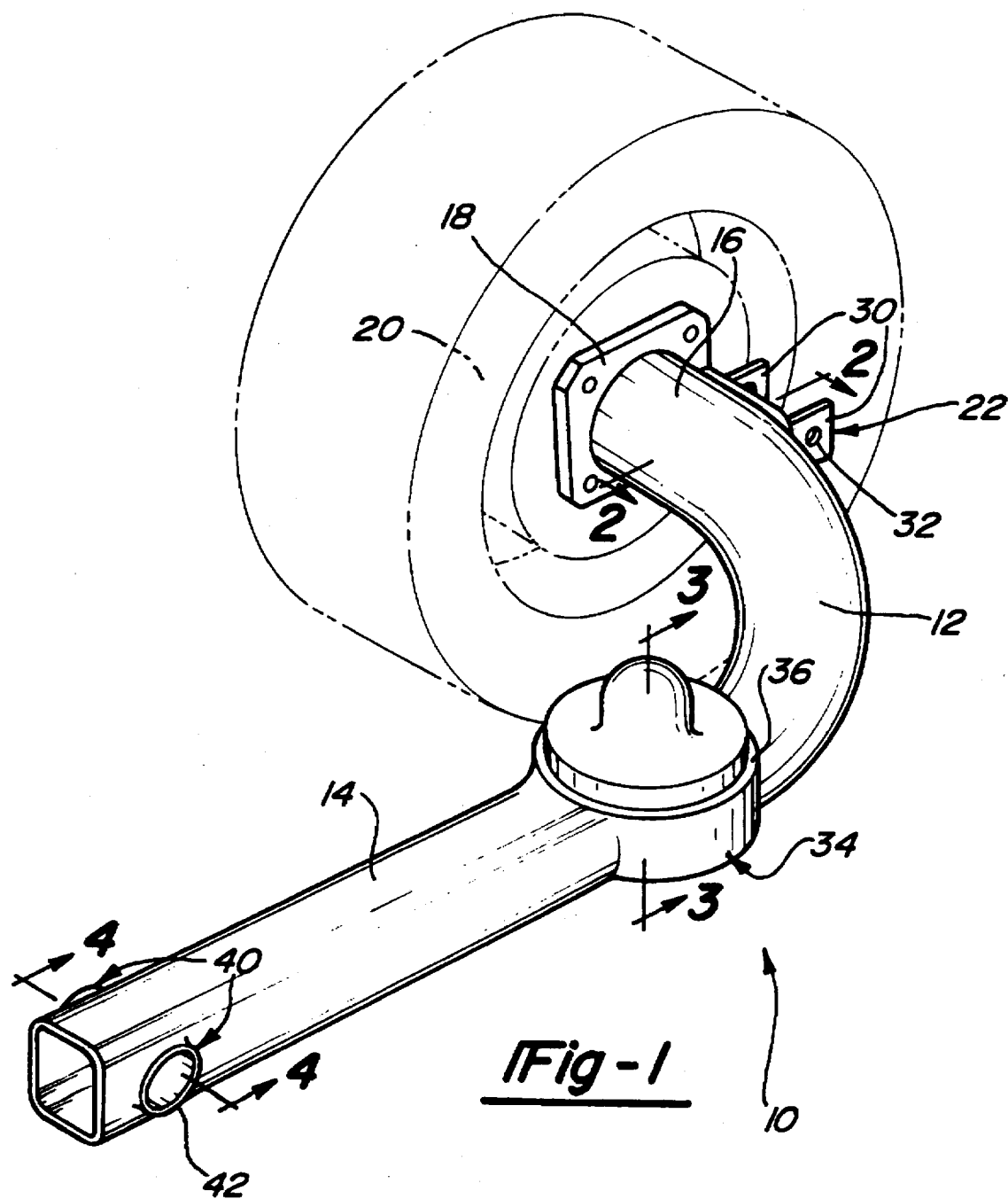
FIG. 1 is a perspective view of a completed vehicle trailing arm constructed in accordance with the present invention.

Referring to the drawing FIGS. 1 through 4, there is shown a tubular trailing arm 10 of a vehicle suspension system. The trailing arm 10 is manufactured using a hydroforming process, as will be subsequently described, giving the arm 10 an integral tubular construction for improved strength and a corresponding reduction in weight and manufacturing costs. Subcomponents of the trailing arm 10 are manufactured during the hydroforming process which are used to support components of the suspension system and to mount the trailing arm within the vehicle. It is contemplated that the process of hydroforming the arm 10 can be utilized in the manufacture of various vehicle frame and suspension components. The present invention will be described in conjunction with a tubular section of an axle assembly used on a vehicle suspension.

The trailing arm 10 preferably has a tubular cross-sectional configuration formed as a direct result of the hydroforming process. Incorporated into the trailing arm 10 is a compound curve portion 12 extending between a linear section 14 and an outer end 16. Mounted to the outer end 16 of the tubular arm 10 is a wheel mounting plate 18 which is added to the hydroformed arm 10 to facilitate attachment of a wheel assembly 20. The compound curvature of the trailing arm 10 is formed during the initial hydroforming process as will be described and is determined by the engineering specifications of the vehicle manufacturer according to spacial constraints. The hydroforming process lends itself to forming such curves because it facilitates bending without crimping of the metal material.

Formed proximate the outer end 16 of the trailing arm 10 is a shock mount bracket 22 (FIG. 2). The shock mount bracket 22 is formed as a bulge 24 in the wall of the tube 26 and then machined to the required configuration. The bracket 22 includes a cut-out 28 which creates a pair of opposing side flanges 30. The flanges 30 are provided with apertures 32 for securing the vehicle shock (now shown) to the suspension.

Formed at an intermediate point along the trailing arm 10, approximately where the compound curve portion 10 joins the linear portion 14, is a spring locator and seat 34. The seat is hydroformed within the tubular trailing arm 10 as will be subsequently described and is designed to support and position a vehicle spring (not shown) of the suspension system. The seat 34 has an annular configuration with an annular shoulder 36 formed around the circumference of the seat 34 for supporting the vehicle spring. An axial nipple 38 is formed at the center of the seat 34 to facilitate and maintain alignment of the spring on the seat 34. The entire configuration of the spring seat 34 is integrally formed within the trailing arm 10 by bulge hydroforming the tubular blank into a die cavity corresponding to the desired configuration of the seat 34.

The linear end 14 of the trailing arm 10 preferably is provided with a square or rectangular cross-sectional configuration during hydroforming. The specific configuration of this section 14 of the arm 10 will be determined by the component of the vehicle with which the trailing arm 10 is connected. Formed in the arm 10 is a bushing mount 40 for matingly receiving a bushing (not shown). The bushing mount 40 is formed by creating a pair of opposing bulges which are then cut-off to form an annular flange 42. The bushing is matingly inserted between the flanges.

The trailing arm 10 of the present invention is manufactured using internal fluid pressure to hydroform its complex configuration thereby maintaining an integral construction. The process of hydroforming the trailing arm 10 begins with a tubular blank of a predetermined length and wall thickness. The ends of the tubular blank are sealed and a pressurizing fluid is injected into the tube. The fluid pressure within the tube is raised to a predetermined level so as to support the walls of the tube but not bulge the walls outwardly. With the walls internally supported by the pressurizing fluid, the tube is bent in accordance with the required compound curvature.

Following bending, the compound tube is positioned within a die cavity substantially conforming to the compound curvature of the tube. The die cavity includes secondary cavities conforming to the subcomponents of the trailing arm. For instance, the die cavity can include secondary cavities for the shock mount, the spring seat and the lateral bushing mounts. In addition, the portion of the die cavity proximate the bushing mount will have a square or rectangular configuration to form the linear portion 14 of the arm 10. With the bent tube secured within the die cavity, internal fluid pressure is increased to bulge the walls of the tube outwardly into the secondary cavities substantially filling the die. Simultaneously, the tube may be longitudinally compressed to maintain a nominal wall thickness. The increased internal pressure bulges the walls of the tube to form a side bulge proximate the outer end 16 of the arm, an intermediate bulge to form the spring seat 34 as shown, and a pair of lateral bulges at the linear portion 14. Following removal from the die cavity, the side bulge is machined to form the shock mount 22 and the lateral bulges are cut-off to form the bushing mount 40 within the arm 10. Thus, an integrally constructed trailing arm 10 is formed by the process of the present invention which incorporates subcomponents necessary for the vehicle suspension system. Additionally, the integral construction of the trailing arm allows the elimination of reinforcing components commonly utilized in the suspension system. By incorporating the integral trailing arm 10, the panhard rod and reinforcement plate can be eliminated. This results from the improved strength and integrity of the tubular trailing arm manufactured in accordance with the present invention.

The foregoing detailed description has been given for clearness of understanding only and no unnecessary limitations should be understood therefrom as some modifications will be obvious to those skilled in the art without departing from the scope and spirit of the appended claims.

What is claimed is:

1. A process of manufacturing a tubular suspension component for a vehicle, said suspension component having an integral tubular configuration with an outer end and an inner end, said process comprising the steps of:

selecting a tubular blank having a predetermined length, width and material wall thickness;

sealing the ends of said tubular blank and introducing a pressurizing fluid to the interior of said tubular blank, said fluid pressurized to a predetermined level to support said wall of said blank without deforming said wall;

bending said tubular blank to a predetermined curvature while maintaining fluid pressurization with said blank;

positioning said bent tube in a cavity having a wall configuration conforming to the configuration of said suspension component and including at least one secondary cavity for integrally forming a subcomponent of said suspension component;

increasing the internal fluid pressure within said bent tube to expand said tube into engagement with the wall of said die cavity including expanding the wall of said bent tube into said at least one secondary cavity to form said at least one integral subcomponent of said suspension component; and depressurizing said tubular component and releasing said integral suspension component from said die cavity.

2. The process as defined in claim 1 wherein a portion of said die cavity has a substantially rectangular configuration to form a substantially rectangular cross-sectional configuration along a portion of said tubular suspension component upon expansion of said bent tube within said die cavity.

3. The process as defined in claim 1 wherein said at least one secondary cavity of said die cavity includes a spring seat cavity having a diameter greater than the diameter of said die cavity, said bent tube being expanded upon application of increased internal fluid pressure to fill said spring seat cavity thereby forming a spring seat within said tubular suspension component.

4. The process as defined in claim 3 wherein said at least one secondary cavity of said die cavity includes a shock mount cavity projecting from one side of said die cavity, said bent tube being expanded upon application of increased internal fluid pressure to fill said shock mount cavity forming a shock mount projection on said tubular suspension component.

5. The process as defined in claim 4 and comprising the further step of machining said shock mount projection to form a pair of opposing flanges.

6. The process as defined in claim 3 wherein said at least one secondary cavity of said die cavity includes a pair of opposing bushing cavities projecting from opposing sides of said die cavity, said bent tube being expanded upon application of increased internal fluid pressure to fill said bushing cavities forming opposing bushing projections on said tubular suspension compound.

7. The process as defined in claim 6 and comprising the further step of machining said bushing projections to form a bushing mount.

* * * * *